US012790487B2

(12) United States Patent
Chen et al.

(10) Patent No.: US 12,790,487 B2
(45) Date of Patent: Nov. 10, 2026

(54) POLYAMIDE COMPOSITION FOR OPTICAL ELEMENTS

(71) Applicant: BASF SE, Ludwigshafen am Rhein (DE)

(72) Inventors: Lin Chen, Shanghai (CN); Yao Tao Wang, Shanghai (CN); Suresh Parappuveetil Sarangadharan, Shanghai (CN); Hang Lu, Shanghai (CN)

(73) Assignee: BASF SE, Ludwigshafen am Rhein (DE)

( * ) Notice: Subject to any disclaimer, the term of this patent is extended or adjusted under 35 U.S.C. 154(b) by 854 days.

(21) Appl. No.: 17/995,681

(22) PCT Filed: Mar. 30, 2021

(86) PCT No.: PCT/EP2021/058319
§ 371 (c)(1),
(2) Date: Oct. 6, 2022

(87) PCT Pub. No.: WO2021/204600
PCT Pub. Date: Oct. 14, 2021

(65) Prior Publication Data

US 2023/0133994 A1 May 4, 2023

(30) Foreign Application Priority Data

Apr. 9, 2020 (WO) ................ PCT/CN2020/083965

(51) Int. Cl.

| | |
|---|---|
| ***C08L 77/06*** | (2006.01) |
| ***C08K 3/34*** | (2006.01) |
| ***C08K 7/10*** | (2006.01) |
| ***G02B 1/04*** | (2006.01) |

(52) U.S. Cl.
CPC ................ *C08L 77/06* (2013.01); *C08K 3/34* (2013.01); *C08K 7/10* (2013.01); *G02B 1/04* (2013.01); *C08K 2003/343* (2013.01); *C08K 2201/004* (2013.01); *C08K 2201/005* (2013.01); *C08K 2201/011* (2013.01); *C08K 2201/016* (2013.01); *C08L 2205/025* (2013.01); *C08L 2205/12* (2013.01)

(58) Field of Classification Search
None
See application file for complete search history.

(56) References Cited

U.S. PATENT DOCUMENTS

| | | | | |
|---|---|---|---|---|
| 8,476,354 B2 * | 7/2013 | Topoulos | C08L 77/06 428/220 | |
| 2013/0022786 A1 * | 1/2013 | Topoulos | C08K 7/14 428/141 | |
| 2014/0127440 A1 | 5/2014 | Norfolk et al. | | |
| 2015/0175804 A1 * | 6/2015 | Aepli | C08K 5/5313 524/100 | |
| 2016/0102202 A1 * | 4/2016 | Lamberts | C08L 77/06 524/413 | |

FOREIGN PATENT DOCUMENTS

| | | |
|---|---|---|
| EP | 0856536 B1 | 5/2003 |
| JP | H07149891 A * | 6/1995 |
| JP | 5399136 B2 | 1/2014 |

OTHER PUBLICATIONS

Lydia Lanzl, The effect of short glass fibers on the process behavior of polyamide 12 during selective laser beam melting, Jan. 2020, Elsevier, vol. 83 (Year: 2020).*
International Search Report and Written Opinion for PCT/EP2021/058319 issued on Jun. 25, 2021, 11 pages.

* cited by examiner

*Primary Examiner* — Robert S Jones, Jr.
*Assistant Examiner* — Christiaan Roelofse
(74) *Attorney, Agent, or Firm* — Armstrong Teasdale LLP

(57) ABSTRACT

Disclosed herein is a polyamide composition, including from 30 wt % to 70 wt % of polyamide mixture and from 30 wt % to 70 wt % of filler mixture, and from 0 to 10 wt % of additives (E), based on the total weight of the polyamide composition. The polyamide composition provides advantage of good flatness and less dust particles, meanwhile the mechanical properties are maintained. Such advantage makes the polyamide composition especially suitable for the optical element application.

17 Claims, No Drawings

POLYAMIDE COMPOSITION FOR OPTICAL ELEMENTS

CROSS-REFERENCE TO RELATED APPLICATIONS

This application is a U.S. National Phase Application of International Patent Application No. PCT/EP2021/058319, filed Mar. 30, 2021, which claims priority to Chinese Patent Application No. PCT/CN2020/083965, filed Apr. 9, 2020, each of which is hereby incorporated by reference herein.

FIELD OF THE INVENTION

The present invention relates to a material for a camera module. More specifically, the present invention relates to a polyamide composition used for all the plastic parts of camera modules, lens assemblies, lens units, camera module assemblies, and optical elements.

DESCRIPTION OF THE RELATED ART

Thermoplastic molding composition is widely used as structuring part in consumer electronics application such as housing, frame and cover due to its design flexibility and cost competitiveness.

However, for some special area such as optical related components, where there is even higher and more special requirement, it is usually not easy for plastic to balance all the required properties. Camera modules are mounted in electronic devices such as mobile phones, laptop computers, digital cameras, digital video cameras and the like. Several parts of camera modules, for example a lens barrel portion (section where the lens is placed), a mount holder portion (section in which the barrel is mounted and which is fixed to the substrate), and the module substrate, can be produced by plastic material to reduce cost and weight and realize surface mounting technology ("SMT"). During past ten years, crystalline polymer like polyamide (PA) or liquid crystalline polymer (LCP) are gradually developed as the best plastic solution for this camera module because of their excellent flow-ability for thin wall precise molding. However, for conventional liquid crystal polymer compositions, particles composed of the LCP composition exfoliate from the lens barrel, the portions where both the mount holder and lens barrel wear against each other, and the surfaces of both plastic parts during the threaded movement of the lens barrel portion. If a barrel or holder fragment is generated during the manufacturing or use of the camera module, it will adhere to the image sensor surface or lens surface, thereby becoming one of large causes for image defects (black scratches or spots).

EP0856536 B1 describes a filler reinforced LCP with good heat resistance and flow-ability for this camera module application, but it does not solve the problem of dust particle caused by the surface orientation effect of LCP molecule.

JP5399136 B2 uses the milled glass fiber as the filler to solve the dust particle issue of PA9T based solution, but material dimensional stability especially the warpage control is still the concern for real application.

In order to fulfill accurate image pickup and keep high image quality during long-term usage, apart from the basic mechanics, excellent dimensional stability, low dust and warpage control are necessary for the plastic parts of the camera module. However, up till now, both solutions still have their respective drawback regarding the above-mentioned property balance.

SUMMARY OF THE INVENTION AND ADVANTAGES

In view of the above prior art, the problem to be solved in the present invention is to provide a polyamide composition, comprising from 30 wt % to 70 wt % of polyamide mixture and from 30 wt % to 70 wt % of filler mixture, from 0 to 10 wt % of additives (E), based on the total weight of the polyamide composition; wherein the polyamide mixture includes as component (A) semi-crystalline semi-aromatic polyamide and as component (B) amorphous polyamide, the mass ratio of (A)/(B) is higher than 1:1; the filler mixture includes as component (C) needle-like fillers having an average length of equal to or less than 150 μm; and as component (D) plate-like fillers, the mass ratio of (C)/(D) is higher than 1:1.

The terms "a", "an" and "the" are used interchangeable with the term "at least one". The phrases "at least one of" and "comprises at least one of" followed by a list refers to any one of the items in the list and any combination of two or more item in the list. All numerical ranges are inclusive of their endpoints and non-integral values between the endpoints unless otherwise stated.

The average length and average major diameter of the needle-like fillers, the equivalent circular diameter and thickness of the plate-like fillers is measured by scanning electron microscope ("SEM") via direct measurement of size of the fillers (100-120 counts) in the graph and calculated by arithmetic mean.

The present invention provides a part for a camera module, lens assembly, lens unit, camera module assembly and optical element.

The present invention provides a method of preparing the polyamide composition.

The present invention provides a use of the polyamide composition in camera module, lens assembly, lens unit, camera module assembly and optical element.

The polyamide composition in the present invention provides advantage of good flatness and less dust particles, meanwhile the mechanical properties are maintained. Such advantage makes the polyamide composition especially suitable for the optical element application.

DETAILED DESCRIPTION OF THE INVENTION

Disclosed is a polyamide composition, comprising from 30 wt % to 70 wt % of polyamide mixture and from 30 wt % to 70 wt % of filler mixture, from 0 to 10 wt % of additives (E), based on the total weight of the polyamide composition; wherein the polyamide mixture includes as component (A) semi-crystalline semi-aromatic polyamide and as component (B) amorphous polyamide, the mass ratio of (A)/(B) is higher than 1:1; the filler mixture includes as component (C) needle-like fillers having an average length of equal to or less than 150 μm; and as component (D) plate-like fillers, the mass ratio of (C)/(D) is higher than 1:1.

The term semi-crystalline polyamide is herein understood a polyamide that has crystalline domains as demonstrated by the presence of a melting peek with a melting enthalpy of at least 5 J/g. The term semi-aromatic polyamide is herein understood a polyamide derived from monomers comprising at least one monomer containing an aromatic group and at least one aliphatic or cycloaliphatic monomer.

The semi-crystalline semi-aromatic polyamide in the present invention comprises repeated units derived from dicarboxylic acids, diamines, and optionally other monomers such as amino acids and/or lactams, for example from the dicarboxylic acids comprising at least one aromatic dicarboxylic acid and the diamines comprising at least one aliphatic diamine, or from the dicarboxylic acids comprising at least one aliphatic or cycloaliphatic dicarboxylic acid and the diamines comprising at least one aromatic diamine.

The other monomers are preferably in an amount of from 0 to 20 mol %, preferably from 0 to 15 mol %, more preferably from 0 to 10 mol %, based on the total monomers constituting the semi-crystalline semi-aromatic polyamide.

In a preferred embodiment of the present invention, the semi-crystalline semi-aromatic polyamide comprises repeat units derived from dicarboxylic acid and diamine, and 0 to 20 mol % of amino acids and/or lactams, based on the total monomers constituting the semi-crystalline semi-aromatic polyamide;

wherein the dicarboxylic acid is aromatic dicarboxylic acid (a-1), or a combination of the aromatic dicarboxylic acid (a-1) and the other dicarboxylic acid (a-2) including aliphatic dicarboxylic acid and/or cycloaliphatic dicarboxylic acid. The aromatic dicarboxylic acid (a-1) is preferably in an amount of 60-100 mol %, the other dicarboxylic acid (a-2) is preferably in an amount of 0-40 mol %, based on the total mole of the dicarboxylic acids constituting the semi-crystalline semi-aromatic polyamide;

the diamine is aliphatic diamine (b-1), or a combination of aliphatic diamine (b-1) and aromatic diamine (b-2). The aliphatic diamine (b-1) is preferably in an amount of 80-100 mol %, the aromatic diamine (b-2) is preferably in an amount of 0-20 mol %, based on the total mole of the diamines constituting the semi-crystalline semi-aromatic polyamide.

In a preferred embodiment of the present invention, the semi-crystalline semi-aromatic polyamide comprises repeat units derived from dicarboxylic acid and diamine, and 0 to 20 mol % of amino acids and/or lactams, based on the total monomers constituting the semi-crystalline semi-aromatic polyamide;

wherein the dicarboxylic acid is aliphatic dicarboxylic acid or a combination of aliphatic dicarboxylic acid and cycloaliphatic dicarboxylic acid. The aliphatic dicarboxylic acid is preferably in an amount of 80-100 mol %, the cycloaliphatic dicarboxylic acid is preferably in an amount of 0-20 mol %, based on the total mole of the dicarboxylic acids constituting the semi-crystalline semi-aromatic polyamide; the diamine is aromatic diamine, a combination of aromatic diamine and aliphatic diamine. The aromatic diamine is preferably in an amount of 80-100 mol %, the aliphatic diamine is preferably in an amount of 0-20 mol %, based on the total mole of the diamines constituting the semi-crystalline semi-aromatic polyimide.

The aromatic dicarboxylic acid in the present invention preferably comprises from 8 to 20 carbon atoms, more preferably from 8 to 14 carbon atoms, such as terephthalic acid, isophthalic acid, naphthalenedicarboxylic acids and/or diphenyldicarboxylic acids.

The aliphatic dicarboxylic acid in the present invention preferably comprises from 4 to 36 carbon atoms, more preferable from 6 to 36 carbon atoms, most preferable from 6 to 18 carbon atoms or 36 carbon atoms. Examples of the aliphatic dicarboxylic acid are succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanoic acid, hexadecanedioic acid, octadecanedioic acid and/or dimer acid having 36 carbon atoms, more preferably is adipic acid, sebacic acid and/or dodecanedioic acid.

The cycloaliphatic dicarboxylic acid in the present invention preferably comprises from 4 to 20 carbon numbers, more preferably from 8 to 20 carbon numbers, more preferably comprises one carbon backbone selected from the group consisting of cyclohexane, cyclopentane, cyclohexylmethane, dicyclohexylmethane, bis(methylcyclohexyl), most preferably is selected from the group consisting of cis- and trans-cyclopentane-1,3-dicarboxylic acid, cis- and trans-cyclopentane-1,4-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid.

The aliphatic diamine in the present invention could be linear aliphatic diamine or branched aliphatic diamine, preferably is linear aliphatic diamine. The aliphatic diamine preferably comprises from 4 to 36, more preferably from 6 to 22 carbon atoms or 36 carbon atoms, most preferably from 6 to 12 carbon atoms. Examples of the linear aliphatic diamines are 1,4-butane diamine, 1,5-pentane diamine, 1,6-hexane diamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,16-hexadecanediamine, 1,18-octadecanediamine, 1,20-eicosanediamine and/or 1,22-docosanediamine, preferably is 1,6-hexane diamine, 1,8-octanediamine, 1,9-nonanediamine, 1,10-decanediamine, 1,11-undecanediamine and/or 1,12-dodecanediamine, more preferably is 1,9-nonanediamine, 1,10-decanediamine, 1,11-undecanediamine and/or 1,12-dodecanediamine. Examples of the branched aliphatic diamines are 2-methyl-1,5-pentane diamine, 3-methyl-1,5-pentane diamine, 2-methyl-1,8-octanediamine, 5-methyl-1,9-nonanediamine, 2,4,4-trimethylhexamethylene diamine, 2,2,4-trimethylhexamethylene diamine and/or 2,4-dimethyloctanediamine, preferably is 2-methyl-1,5-pentane diamine, 3-methyl-1,5-pentane diamine, 2-methyl-1,8-octanediamine, 2,4,4-trimethylhexamethylene diamine and/or 2,2,4-trimethylhexamethylene diamine.

The aromatic diamine in the present invention is preferably selected from the group consisting of m-xylylenediamine (MXD), p-xylylenediamine (PXD), bis(4-aminophenyl)methane, 3-methylbenzidine, 2,2-bis(4-aminophenyl) propane, 1,1-bis(4-aminophenyl)cyclohexane, 1,2-diaminobenzene, 1,3-diaminobenzene, 1,4-diaminobenzene, 1,2-diaminonaphthalene, 1,3-diaminonaphthalene, 1,4-diaminonaphthalene, 2,3-diaminotoluene, N,N'-dimethyl-4,4'-biphenyldiamine, bis(4-methylaminophenyl)methane and 2,2'-bis(4-methylaminophenyl)propane, more preferably is MXD and/or PXD.

Examples of the semi-crystalline semi-aromatic polyamide is polyamide MXD6, polyamide PXD6, polyamide MXD9, polyamide PXD9, polyamide MXD10 and/or polyamide PXD10.

The suitable amino acid in the present invention preferably comprises from 4 to 12 carbon atoms. Examples of the amino acid are 4-aminobutanoic acid, 6-aminocaproic acid, 7-aminoheptanoic acid, 8-aminooctanoic acid, 10-aminodecanoic acid, 11-aminoundecanoic acid and/or 12-aminododecanoic acid.

The suitable lactam in the present invention preferably comprises from 4 to 12 carbon atoms, more preferably from 6 to 12 carbon atoms. Examples of the lactam are 2-pyrrolidone (γ-butyrolactam), 2-piperidone (δ-valerolactam), ε-caprolactam, capryllactam, decanelactam, undecanolactam, enantholactam and/or lauryllactam, preferably is ε-caprolactam and/or undecanolactam.

In one preferred embodiment, the semi-crystalline semi-aromatic polyamide comprises repeat units derived from dicarboxylic acid and diamine, wherein, the dicarboxylic acid is aromatic dicarboxylic acid (a-1), or a combination of the aromatic dicarboxylic acid (a-1) and the other dicarboxylic acid (a-2), the aromatic dicarboxylic acid (a-1) is terephthalic acid, naphthalene dicarboxylic acid, biphenyl dicarboxylic acid, or a combination of at least two thereof, preferably is terephthalic acid or a combination of terephthalic acid and naphthalene dicarboxylic acid; the other dicarboxylic acid (a-2) is aliphatic dicarboxylic acid and/or cycloaliphatic dicarboxylic acid; the aromatic dicarboxylic acid (a-1) is preferably in an amount of 60-100 mol %, more preferably 80-100 mol %, furthermore preferably 90-100 mol %, most preferably 95-100 mol %, based on the total mole of the dicarboxylic acids constituting the semi-crystalline semi-aromatic polyamide; the other dicarboxylic acid (a-2) is preferably in an amount of 0-40 mol %, more preferably 0-20 mol %, furthermore preferably 0-10 mol %, most preferably is equal to or less than 5 mol %, based on the total mole of the dicarboxylic acids constituting the semi-crystalline semi-aromatic polyamide; the diamine is aliphatic diamine (b-1), or a combination of aliphatic diamine and aromatic diamine (b-2). The aliphatic diamine (b-1) is preferably in an amount of 80-100 mol %, more preferably 90-100 mol %, most preferably 95-100 mol %, based on the total mole of the diamines constituting the semi-crystalline semi-aromatic polyamide; the aromatic diamine (b-2) is preferably in an amount of 0-20 mol %, more preferably is 0-10 mol %, most preferably is 0-5 mol %, based on the total mole of the diamines constituting the semi-crystalline semi-aromatic polyamide.

In one preferred embodiment, the semi-crystalline semi-aromatic polyamide comprises repeat units derived from at least one of the aromatic dicarboxylic acid (a-1), and 0-10 mol %, more preferably 0-5 mol % of the other dicarboxylic acid (a-2), and diamine;

- wherein the aromatic dicarboxylic acid (a-1) includes 10-40 mol %, more preferably 15-30 mol %, most preferably 20-30 mol % of isophthalic acid and 60-90 mol %, more preferably 70-85 mol %, most preferably 70-80 mol % of at least one aromatic dicarboxylic acid selected from the group consisting of terephthalic acid, naphthalene dicarboxylic acid and biphenyl dicarboxylic acid, preferably is terephthalic acid or a combination of terephthalic acid and naphthalene dicarboxylic acid; the other dicarboxylic acid is (a-2) is aliphatic dicarboxylic acid and/or cycloaliphatic dicarboxylic acid;
- the diamine is aliphatic diamine(b-1), or a combination of aliphatic diamine and aromatic diamine (b-2). The aliphatic diamine (b-1) is preferably in an amount of equal to or 90-100 mol %, more preferably 95-100 mol %; the aromatic diamine (b-2) is preferably in an amount of 0-10 mol %, more preferably 0-5 mol %, based on the total mole of the diamine.

In one more preferred embodiment, the aliphatic dicarboxylic acid of the other dicarboxylic acid (a-2) is preferably adipic acid, suberic acid, azelaic acid, sebacic acid, undecanedioic acid, dodecanedioic acid, tridecanedioic acid, tetradecanedioic acid, pentadecanoic acid, hexadecanedioic acid, and octadecanedioic acid, more preferably is adipic acid, sebacic acid and/or dodecanedioic acid.

In one more preferred embodiment, the aliphatic diamine (b-1) is a linear aliphatic diamine (b-1a) or the combination of a linear aliphatic diamine and a branched aliphatic diamine (b-1b). The linear aliphatic diamine (b-1a) is preferably selected from the group consisting of 1,4-butane diamine, 1,5-pentane diamine, 1,6-hexane diamine, 1,8-octanediamine, 1,9-nonanediamine, 1,10-decanediamine, 1,11-undecanediamine and 1,12-dodecanediamine. The branched aliphatic diamine(b-1b) is preferably selected from the group consisting of 2-methyl-1,5-pentane diamine, 3-methyl-1,5-pentane diamine, 2-methyl-1,8-octanediamine, 2,4,4-trimethylhexamethylene diamine and 2,2,4-trimethylhexamethylene diamine.

The polyamide in the present invention could comprise a polyamide copolymer or a blend of two or more polyamide and its copolymer.

The semi-crystalline semi-aromatic polyamide is suitably represented by the notations, R represents one or more of linear aliphatic diamine,
B represents one or more of branched aliphatic diamine,
T represents terephthalic acid,
I represents isophthalic acid,
A represents one or more of aromatic diamine,
Y represents one or more of aliphatic dicarboxylic acid,
V represent one or more of lactam.

The suitable semi-crystalline semi-aromatic polyamide could be represented by PA RT, PA RT/RI, PA RT/BT, PA RT/BT/RI/BI, which comprising:

- 60-100 mol % of (T), 0-40 mol % of (I), preferably 60-85 mol % of (T), 15-40 mol % of (I), furthermore preferably 65-80 mol % of (T), 20-35 mol % of (I); based on the total mole of (T)+(I); and
- 80-100 mol % of (R), preferably 90-100 mol % of (R); 0-20 mol % of (B), preferably 0-10 mol % of (B); based on the total mole of (R)+(B); R is preferably the linear aliphatic polyamide having from 9 to 36 carbon numbers, more preferably having from 9 to 18 carbon numbers. The examples of these polyamides include PA 4T/4I, PA 4T/6I, PA 5T/5I, PA 6T, PA 6T/6I, PA 6T/8T, PA 6T/10T, PA 6T/10I, PA 9T, PA 10T, PA 12T, PA 10T/10I, PA 6T/9T, PA 6T/12T, PA 4T/6T/DT, PA 4T/10T/DT, PA 4T/4I/6T/6I/DT/DI, PA6T/12T/6I/12I PA 6T/10T/6I, PA 4T/6T/4I/6I, PA 5T/6T/5I/6I, PA 5T/4T/5I/4I, PA 4T/10T/5I/10I, PA 4T/6T/DT, PA 4T/10T/DT or PA4T/4I/6T/6I/DT/DI, preferably is PA6T, PA9T, PA10T, PA 6T/6I, PA 6T/10T, PA6T/12T, PA 6T/10T/6I, PA 6T/DT and/or PA 6T/DT/6I/DI. Herein D is 2-methylpenta-methylenediamine or 3-methyl-1,5-pentanedimine, or a mixture thereof.

In one preferred embodiment, PA 6T/6I comprises 65-80 mol % of (T), 20-35 mol % of (1), based on the total mole of (T)+(I).

In one preferred embodiment, PA 6T/10T comprises 10-60 mol % of (6T), 40-90 mol % of (10T), preferably 10-40 mol % of (6T), 60-90 mol % of (10T), based on the total mole of (T)+(I).

In one preferred embodiment, PA 6T/10T/6I comprises 60-90 mol % of (6T), 5-40 mol % of (6I) and 5-45 mol % of (10T), based on the total mole of (T)+(I).

The suitable semi-crystalline semi-aromatic polyamide could be represented by PA RT/RY, PA RT/V, PA RT/RI/RY or PA RT/RI/V, which comprising:

- 60-100 mol % of (T), 0-40 mol % of (I); 0-12 mol % of (V), preferably 0-5 mol % of (V); 0-80 mol % of (Y), preferably 0-60 mol % of (Y), more preferably 0-40 mol % of (Y); based on the total mole of (T)+(I)+(V)+(Y); R is preferably the linear aliphatic polyamide having from 9 to 36 carbon numbers, more preferably having from 9 to 18 carbon numbers. The examples of these polyamides include PA 6T/6, PA 6T/6I/6, PA 6T/66, PA 5T/510, PA4T/410, PA 6T/610, PA 6T/612, PA 6T/1012, PA 9T/612, PA 9T/1012, PA 10T/106, PA 10T/612, PA 10T/1012, PA 6T/6I/66, PA 6T/10T/6, PA 10T/12, PA 10T/11 and PA 6T/6I/12, preferably is PA 6T/6, PA 6T/610, PA 6T/10T/6 and/or PA 6T/612.

In one preferred embodiment, PA RT/RY comprises 60-100 mol % of (T), 0-40 mol % of (Y), R is 1,6-hexane diamine, 1,9-nonanediamine, 1,10-decanediamine, Y is dodecanedioic acid.

In one preferred embodiment, PA 6T/10T/6 comprises 60-85 mol % of (6T), 15-40 mol % of (10T), and 5-15 mol % of caprolactam, based on the total mole of (T)+(I)+ caprolactam.

The semi-crystalline semi-aromatic polyamide in the present invention has a melting point (Tm) of 255° C.-340° C., preferably 285° C.-330° C., most preferably 305° C.-315° C. The melting point is defined as a temperature corresponding to an endothermic peak in a differential scanning calorimetry (DSC) curve, which is obtained by heating polyamide at a heating rate of 10° C./min using a DSC.

The semi-crystalline semi-aromatic polyamide in the present invention preferably has the viscosity number of 60-120 ml/g, which is measured in 96 wt % $H_2SO_4$ according to ISO307-2007 method.

In one preferred embodiment, the semi-crystalline semi-aromatic polyamides include polyamide MXD6, polyamide 12T, polyamide 10T, polyamide 9T, polyamide 6T/66, polyamide 6T/DT, polyamide 66/6T/6I, polyamide 6T/6, polyamide 6T/6I copolymer, and the like.

The term amorphous polyamide is herein understood a polyamide that has no crystalline domains or essentially so, as demonstrated by lack of melting peak or the presence of a melting peak with a melting enthalpy of less than 5 J/g. The melting enthalpy is expressed relative to the weight of polyamide.

The amorphous polyamide in the present invention includes amorphous aliphatic polyamide and/or amorphous semi-aromatic polyamide.

In one preferred embodiment, the amorphous aliphatic polyamide comprises cycloaliphatic diamine and aliphatic dicarboxylic acid. The cycloaliphatic diamine is preferably selected from the group consisting of bis(3,5-dialkyl-4-aminocyclohexyl)methane, bis(3,5-dialkyl-4-aminocyclohexyl)ethane, bis(3,5-dialkyl-4-am inocyclohexyl)propane, bis(3,5-dialkyl-4-aminocyclohexyl)butane, bis(3-methyl-4-aminocyclohexyl)methane (BMACM or MACM), 4,4'-diaminodicyclohexylmethane (PACM), 2,2-(4,4'-diaminodicyclohexyl)-propane (PACP), isophoronediamine (IPD), bis-(aminomethyl)-cyclohexane (BAC), bis-(4-amino-3-ethyl-cyclohexyl)-methane(EACM) and bis-(4-amine-3,5-dimethyl-cyclohexyl)-methane (TMACM), more preferably is PACM, MACM and/or IPD. The amorphous aliphatic polyamide could be represented by PA CY, C represents one or more of cycloaliphatic dicarboxylic acid. Examples of amorphous aliphatic polyamides are PA MACM6, PA PACM6, PA MACM12, PA PACM10, PA PACM12 and PA IPD6, preferably is PA MACM12 and/or PA PACM12.

In one preferred embodiment, the amorphous semi-aromatic polyamide comprises cycloaliphatic diamine and aromatic dicarboxylic acid. The cycloaliphatic diamine is preferably selected from PACM, MACM and/or IPD. The aromatic dicarboxylic acid is preferably selected from terephthalic acid and/or isophthalic acid.

In one preferred embodiment, the amorphous semi-aromatic polyamide comprises diamine and at least 50 mol % of isophthalic acid, preferably comprises 60-100 mol % of isophthalic acid and 0-40 mol % of terephthalic acid; based on the total moles of the dicarboxylic acid. The amorphous semi-aromatic polyamide could be represented by PA RI, PA RI/RT, PA BI/BT, PA CT, PA BT, PA CI, PA BI, wherein the mole ratio of I/T is at least more than 50/50, preferably is 80:20 to 60:40. Examples of the amorphous semi-aromatic polyamides are PA 6I, PA8I, PA 6I/6T, PA 10I/10T, PA PACMI, PA PACMT, PA MACMT, PA MACMI, PA IPDT, PA IPDI, PA DT/DI, PA DT and PA DI, preferably is PA 6I/6T, PA 12I/12T.

In one preferred embodiment, the amorphous semi-aromatic polyamide comprises aromatic diamine and aliphatic dicarboxylic acid, and optionally comprising 0-20 mol % of isophthalic acid. The amorphous semi-aromatic polyamide could be represented by PA AY, PA AY/AI. Examples of the amorphous semi-aromatic polyamides are PA MXD6/MXDI, wherein MXD6 is in an amount of 80-100 mol %, preferably is 85-95 mol %, based on the total mole of MXD6 and MXDI.

The amorphous polyamide in the present invention preferably has the viscosity number of 60-150 ml/g, which is measured in 96 wt % of $H_2SO_4$ according to ISO307-2007 method.

The amorphous polyamide in the present invention preferably has a solution viscosity $\eta_{rel}$ in the range from 1.3 to 2.0, preferably in the range from 1.4 to 1.8, in particular in the range from 1.45 to 1.75, measured in 0.5 wt % of m-cresol at 20° C.

The semi-crystalline semi-aromatic polyamide (A) in the present invention is preferably in an amount of from 30 wt % to 65 wt %, more preferably from 40 wt % to 60 wt %; the amorphous polyamide (B) in the present invention is preferably in an amount of from 5 wt % to 40 wt %, more preferably from 10 wt % to 30 wt %; based on the total weight of polyamide composition.

The weight ratio of component (A)/component (B) is higher than 1:1, preferably equal to or higher than 2:1, more preferably in a range of 3:1 to 2:1, most preferably is in a range of 3:1 to 2.5:1.

The needle-like filler (C) in the present invention preferably has an average length of from 10 μm to 150 μm, more preferably from 10 μm to 100 μm, most preferably from 10 μm to 75 μm. The aspect ratio (length/diameter) of the needle-like filler is preferably equal to or higher than 2:1, more preferably from 2:1 to 5000:1, furthermore preferably from 3:1 to 100:1, most preferably from 4:1 to 30:1, or 4:1 to 18:1. The aspect ratio (length/diameter) is the ratio of average length to the average major diameter of the cross-section. The shape of the cross-section is not limited, e.g. oval, round, rectangle.

The needle-like fillers (C) in the present invention are preferably selected from the group consisting of glass fibers, wollastonite, carbon fibers, metal fibers, mineral fibers, potassium titanate, aluminum borate, more preferably is glass fibers, chopped glass fibers, milled glass fibers, potassium titanate and/or wollastonite. Preferably, the glass fiber can be E-glass fibers, A-glass fibers, D-glass fibers, AR-glass fibers, C-glass fibers, S-glass fibers. The cross sections of the glass fiber can be round or non-circular, preferably is round.

The need-like fillers are preferably surface-treated by a silane coupling agent, such as vinylsilane-based coupling agents, acrylic silane-based coupling agents, epoxysilane-based coupling agents and aminosilane-based coupling agents, preferable is aminosilane-based coupling agents. The silane coupling agent may be dispersed in a sizing agent. Examples of the sizing agents are acrylic compounds, acrylic/maleic derivative modified compounds, epoxy compounds, urethane compounds, urethane/maleic derivative modified compounds and urethane/amine modified compounds.

The plate-like fillers (D) in the present are generally in the form of stacked plates, platelets, sheets, leaves, powders or flakes. The aspect ratio (ECD/T) is generally equal to or greater than 1:1, preferably is equal to or greater than 30:1, more preferably is equal to or greater than 100:1, most preferably is equal to or greater than 200:1. The aspect ratio (ECD/T) is general equal to or less than 1000:1, preferably is equal to or less than 800:1, more preferably is equal to or less than 600:1, most preferably is equal to or less than 500:1. The ECD represents the equivalent circular diameter of the plate-like fillers. T represents the longest thickness of the plate-like fillers. The aspect ratio and equivalent circular diameter can be measured using scanning electron microscopy ("SEM") images. The equivalent circular diameter can be defined as a diameter of a circle that has the same area as the plate area of the plate-like fillers.

In one preferred embodiment of the invention, the plate-like fillers (D) have an aspect ratio (ECD/T) of from 1:1 to 500:1, preferably of from 100:1 to 500:1, most preferably from 200:1 to 400:1.

In one preferred embodiment of the invention, the plate-like fillers (D) have an average size of from 0.001 μm to 100 μm in their longest thickness or dimensions, preferably from 0.001 μm to 50 μm, most preferably from 0.001 um to 10 μm, or 0.001 μm to 5 μm.

In some embodiment, the plate-like filler can have an average equivalent circular diameter of at least about 10 μm, typically from 10 μm to 900 μm, preferably from 20 μm to 500 μm, most preferably from 20 μm to 300 μm, or from 30 μm to 200 μm.

In one embodiment of the present invention, the aspect ratio (ECD/T) of the plate-like filler is from 1:1 to 300:1, the average equivalent circular diameter of the plate-like filler is from 20 μm to 300 μm.

The plate-like fillers (D) in the present invention are preferably selected from the group consisting of talc, mica, silicate, quartz, titanium dioxide, wollastonite, kaolin, magnesium carbonate, magnesium hydroxide, chalk, limestone, feldspar, barium sulfate, solid or hollow glass beads, ground glass, glass flakes, and durably magnetic materials, such as magnetizable metal compounds, and/or alloys or mixtures thereof.

The semi-crystalline semi-aromatic polyamide (A) in the present invention is preferably in an amount of from 30 wt % to 60 wt %, more preferably from 30 wt % to 50 wt %; the amorphous polyamide (B) in the present invention is preferably in an amount of from 10 wt % to 30 wt %, more preferably from 10 wt % to 20 wt %; based on the total weight of the polyamide composition.

The weight ratio of component (C)/component (D) is preferably equal to or higher than 1.5:1, more preferably is in a range of 2:1 to 4:1.

The polyamide composition could also comprise various conventional additives (E) so long as the additives and the amount thereof not significantly adversely affect the desired properties of the composition in the invention. The additives could include lubricants, surface effect additives, antioxidants, colorants, pigments, stabilizers (thermal, UV, radiation or hydrolysis stabilizers), flow modifiers, plasticizers, demolding agents, anti-drip agents, ultraviolet absorbing agents, nucleating agents, antistatic agents, elastomer modifiers, release agents and/or antimicrobial agents.

The lubricant is not particularly limited, such as an ester, amide, alkali metal salt, alkaline earth metal salt of fatty acids having from 10 to 40 carbon atoms (e.g., such as Ca stearate, Zn stearate, Mg behenate, Mg stearate), polyethylene wax, polypropylene wax, ester wax, EVA wax, oxidized polyethylene wax, fatty alcohols, fatty acids, montan wax, pentaerythrityl tetrastearate (PETS) and silicone wax. A preferred lubricant is ethylene bis(stearamide).

The lubricant is preferably present in an amount of about 0 wt % to 3 wt %, more preferably of about 0.01 wt % to 2 wt %, or 0.2 wt % to 1 wt %, or 0.2 wt % to 0.8 wt %, based on the total weight amount of the polyamide composition.

The antioxidant is not particularly limited, such as aromatic amine-based antioxidant agent, hindered phenol-based antioxidant agents, phosphite-based antioxidant agents, metal salts and iodides.

Examples of aromatic amine-based antioxidant agent are poly(1,2-dihydro-2,2,4-trimethyl-quinoline), bis(4-octylphenyl)amine, 4,4'-bis(α,α-dimethylbenzyl)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, N,N'-bis(methylphenyl)-1,4-benzenediamine and hydrazine derivatives.

Examples of hindered phenol-based antioxidant agents are poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester. And preferably the solid hindered phenol-based antioxidant agent is one or more selected from group "B-S" consisted of 2,4-bis[(dodecylthio)methyl]-o-cresol, 4,4'-butylidene bis-(3-methyl-6-tert-butylphenol), 3,5-bis(1,1-dimethylethyl)-4-hydroxybenzenepropanoic acid octadecyl ester, pentaerythritol tetrakis(3-(3,5-di-tert-butyl-4-hydroxyphenyl) propionate), triethylene glycol-bis[3-(3-tert-butyl-5-methyl-4-hydrophenyl) propionate], 2,4-bis(n-octylthio)-6-(4-hydroxy-3,5-di-tert-butylanilino)-1,3,5-triazine, tris-(3,5-di-tert-butyl-4-hydroxybenzyl)-isocyanurate, 2,2-thio-diethylene bis[3-(3,5-di-tert-butyl-4-hydroxyphenyl) propionate].

Examples of phosphite-based antioxidant agents are tris (2,4-di-tert-butylphenyl) phosphite (Irgafos® 168, BASF SE, CAS 31570-04-4), bis(2,4-di-tert-butylphenyl)pentaerythrityl diphosphite (Ultranox® 626, Chemtura, CAS 26741-53-7), bis(2,6-di-tert-butyl-4-methylphenyl)pentaerythrityl diphosphite (ADK Stab PEP-36, Adeka, CAS 80693-00-1), bis(2,4-dicumylphenyl)pentaerythrityl diphosphite (Doverphos® S-9228, Dover Chemical Corporation, CAS 154862-43-8), tris(nonylphenyl) phosphite (Irgafos® TNPP, BASF SE, CAS 26523-78-4), (2,4,6-tri-t-butylphenol)-2-butyl-2-ethyl-1,3-propanediol phosphite (Ultranox® 641, Chemtura, CAS 161717-32-4) and Hostanox® P-EPQ.

Examples of commercial antioxidant are the combination of copper salts with iodides, such as Brüggolen® H3350 from Brüggemann-Gruppe, or Polyad® PB201 from PolyAd Services.

The antioxidant agent is preferably present in an amount of about 0 wt % to 2 wt %, more preferably of about 0.01 wt % to 1 wt %, and most preferably of about 0.1 wt % to 0.8 wt %, each based on the total weight amount of the polyamide composition.

The colorant is not particularly limited, such as carbon black, iron oxide, titanium dioxide, ultramarine blue, zinc sulfide, phthalocyanines, quinacridones, perylenes, nigrosin and anthraquinones.

The colorant is preferably present in an amount of about 0 wt % to 5 wt %, more preferably of about 0.01 wt % to 3 wt %, and most preferably of about 0.1 wt % to 2 wt %, based on the total weight amount of the polyamide composition.

The stabilizer is preferably present in an amount of about 0 wt % to 2 wt %, more preferably of about 0.01 wt % to 1 wt %, and most preferably of about 0.01 wt % to 0.5 wt %, each based on the total weight of the polyamide composition.

Examples of suitable nucleating agents are sodium phenylphosphinate or calcium phenylphosphinate, alumina (CAS No. 1344-28-1), talc, silicon dioxide, adipic acid and diphenylacetic acid.

Examples of suitable plasticizers are dioctyl phthalate, dibenzyl phthalate, butyl benzyl phthalate, hydrocarbon oils and N-(n-butyl)benzenesulphonamide.

The amount of all the additives in the present invention is preferably not more than 10 wt %, more preferably is 5 wt % or less, and most preferably is 2 wt % or less, based on the total weight amount of the polyamide composition.

In the preferred embodiment, the polyamide composition comprising: as component (A) 30 wt % to 60 wt % of semi-crystalline semi-aromatic polyamides; preferably selected from the group consisting of PA9T, PA10T, PA11T, PA12T, PA13T, PA14T PA6T/8T, PA10T/6T, PA10T/610, PA6T/610, PA5T/510 and/or PA4T/410, preferably is PA9T, PA10T, PA11T, PA10T/6T, PA10T/610 and/or PA5T/510;

as component (B) 10 wt % to 30 wt % of amorphous polyamides; preferably selected from the group consisting of PA6I/6T and PA12I/12T;

as component (C) 20 wt % to 40 wt % of needle-like fillers having an average length of from 10 μm to 100 μm;

as component (D) 5 wt % to 20 wt % of plate-like fillers having an average size of from 0.001 μm to 50 μm in their longest thickness or dimensions; as component (E) 0-5 wt % of additives; all based on the total weight of the polyamide composition.

In the preferred embodiment, the polyamide composition comprising:

as component (A) 30 wt % to 60 wt % of semi-crystalline semi-aromatic polyamides selected from the group consisting of PA9T, PA10T, PA11T, PA12T, PA13T, PA14T, PA6T/8T, PA10T/6T, PA10T/610, PA6T/610, PAST/510 and/or PA4T/410, preferably is PA9T, PA10T, PA11T, PA10T/6T PA10T/610 and/or PAST/510;

as component (B) 10 wt % to 30 wt % of amorphous polyamides selected from the group consisting of PA6I/6T, PA12I/12T;

as component (C) 20 wt % to 40 wt % of needle-like fillers having an average length of from 10 μm to 100 μm, and an aspect ratio (length/diameter) of from 3:1 to 100:1;

as component (D) 5 wt % to 20 wt % of plate-like fillers having an average size of from 0.001 μm to 50 μm in their longest thickness or dimensions, and an average equivalent circular diameter of from 20 μm to 300 μm;

as component (E) 0-5 wt % of additives; all based on the total weight of the polyamide composition.

The present invention also discloses a method of preparing the polyamide composition, comprising feeding all the components except the needle-like fillers and the plate-like fillers into an extruder, feeding the needle-like fillers and the plate-like fillers through a downstream feeder, extruding all the components and pelletizing. The extruding is preferably conducted under a temperature of 320° C., preferably from 280° C. to 320° C. The polyamide composition is obtained in a pellet form.

The present invention also discloses a part for a camera module, lens assembly, lens unit, camera module assembly and optical element which is produced from the polyamide composition in the present invention.

The present invention provides a use of the polyamide composition in camera module, lens assembly, lens unit, camera module assembly and optical element.

EXAMPLES

Hereinafter, the present invention will be detailed with reference to Examples, which however shall not be construed as limiting the scope of the present invention. In examples and comparative examples, measurements and evaluations of physical properties are made as described below.

A: PA9T from Kuraray Co., Ltd. (with viscosity number of 79 $cm^3$/g according to ISO307, 1157, 1628, number-average molar mass molecular weight (Mn) of 9600 g/mol).

B: PA 6I/6T, Zytel® HTN301 from Dupont Co., Ltd. (with intrinsic viscosity of 1.19 g/$cm^3$ according to ISO 1183).

C1: wollastonite $CaSiO_3$, Nyglos 4w from Imery Co., Ltd., with an average fiber length of 63 μm and average diameter of 7 μm.

C2: glass fiber, HP 3660 from PPG Industries Inc., with an average diameter of 10 μm and average length of 4.5 mm.

D1: glass flake, MEG160FYX (6145) from Nippon Sheet Glass Co., Ltd., with average equivalent circular diameter of 160 μm and thickness of 0.7 μm.

D2: mica $KMg_3(Si_3Al)O_{10}(FOH)_2$, 325-HK from Imery Co., Ltd., with a mean particle size of 30 μm.

E1: antioxidant AO1098, BNX 1098 from Mayzo Inc.

E2: lubricant, N,N'-ethylenedi(stearamide) from Croda Trading (Shanghai) Co., Ltd.

E3: carbon black from Orion Engineered Carbons.

Examples 1-2(E1, E2) and Comparative Examples 1-7(C1-C7)

The formulations for the examples and comparative examples are shown in the following Table 1. The raw materials except the fillers are mixed together in a Turbula T50A high-speed stirrer, fed into a Coperion ZSK26MC twin-screw extruder, the fillers are fed at a downstream side feeder to keep good shape and aspect ratio; melt-extruded under a temperature of 320° C., pelletized, thus obtaining a polyamide composition in a pellet form.

The dried pellets were processed in an injection molding machine KM130CX, from Krauss Maffei with a clamping force of 130T at melt temperatures of 300° C. to 330° C. to give test specimens.

Tensile strength at break, tensile modulus at break and tensile elongation for samples having thickness of 4 mm were measured according to ISO 527-1-2012. Test specimens of type 1 described in ISO 527-1-2012 were used.

HDT was tested according to method A of ISO 75-2-2013 under 0.45 MPa.

Charpy notched impact strength and Charpy unnotched impact strength was tested according to ISO 179-1-2010 via edgewise impact. The test specimens for Charpy unnotched test is type 1 specimen with the dimensions of 80*10*4 mm (length*width*thickness). The test specimens for Charpy notched test is type 1 with notched type A. All the test specimens were conditioned at 23° C. and 50% relative humidity for 16 h. The tests were conducted under the same atmosphere as conditioning.

Flow length was measured using a spiral flow tooling with a spiral runner. The cross section of the spiral runner has a thickness of 2 mm and width of 5.5 mm, numbered and subdivided centimeters are marked along the runner. The test material was melted at 320° C., then the melt was injected into the spiral runner under 500 bar pressure and 140° C. The spiral runner was filled from a sprue at the center of the spiral runner, and the pressure and temperature were maintained until the melt stopped, the mark number just at the tip of spiral melt giving the flow length.

The material flatness (warpage) performance was evaluated by visual check of a round disk (diameter=82 mm, thickness=0.75 mm) molded at same condition and rated with two ratings: good and poor.

The dust particle of the material is measured by a Rion KS-42D liquid particle counter. The detailed method is: the molded plastic part (round disk with thickness of 0.75 mm and diameter of 82 mm) is firstly rinsed with detergent and de-ionized water and dried with nitrogen; secondly the plastic part is immersed in 500 ml de-ionized water and cleaned by ultrasonic cleaning machine for 5 min with a power of 200 W. Then the de-ionized water is immediately pumped into the particle counter to count the dust particle concentration. The detection range of particle is set from 10 um~100 um.

TABLE 1

| | E1 | E2 | C1 | C2 | C3 | C4 | C5 | C6 | C7 |
|---|---|---|---|---|---|---|---|---|---|
| Component | | | | | | | | | |
| A PA9T | 43.7 | 43.7 | 58.7 | 28.7 | 43.7 | 43.7 | 43.7 | 58.7 | 58.7 |
| B PA6I/6T | 15 | 15 | — | 30 | 15 | 15 | 15 | 20 | — |
| C1 Wollastonite | 30 | 30 | 30 | 30 | 40 | 10 | — | 15 | 40 |
| C2 Glass fiber | — | — | — | — | — | — | 3 | — | — |
| D1 Glass flake | 10 | — | 10 | 10 | — | 30 | 10 | 5 | — |
| D2 Mica | — | 10 | — | — | — | — | | — | — |
| E1 AO1098 | 0.3 | 0.3 | 0.3 | 0.3 | 0.3 | 0.3 | 0.3 | 0.3 | 0.3 |
| E2 EBS | 0.5 | 0.5 | 0.5 | 0.5 | 0.5 | 0.5 | 0.5 | 0.5 | 0.5 |
| E3 Carbon black | 0.5 | 0.5 | 0.5 | 0.5 | 0.5 | 0.5 | 0.5 | 0.5 | 0.5 |
| Properties | | | | | | | | | |
| Spiral flow length (cm) | 56 | 60 | 59 | 50 | 55 | 52 | 57 | 61 | 56 |
| Tensile Modulus (GPa) | 11.1 | 11.5 | 10.7 | 10.8 | 11.6 | 11.4 | 12.5 | 5.9 | 12.1 |
| Tensile Strength (MPa) | 94 | 85 | 76 | 98 | 95 | 97 | 146 | 60 | 86 |
| Tensile elongation (%) | 1 | 0.9 | 0.8 | 1.3 | 1.1 | 1.1 | 1.4 | 1.1 | 0.9 |
| HDT 0.45 MPa (° C.) | 261 | 263 | 278 | 210 | 251 | 269 | 285 | 238 | 274 |
| Charpy notched (kJ/m$^2$) | 1.8 | 1.9 | 1.6 | 2.1 | 1.8 | 2.2 | 7.6 | 1.5 | 1.6 |
| Charpy unnotched (kJ/m$^2$) | 23 | 25 | 19 | 20 | 26 | 25 | 48 | 16 | 25 |
| Flatness (rating) | Good* | Good | Poor* | Good | Poor | Good | Poor | Poor | Poor |
| Dust particle (number/ml) | 8 | 11 | 22 | 9 | 7 | 18 | 32 | 6 | 15 |

*"Good" means no obvious warpage, "Poor" means severe warpage or a little warpage.

Seen from Table 1, the examples of the present invention keep the good flowability, tensile properties, impact properties, and have outstanding effect on decreasing dust particles and warpage, which is especially applicable for camera modules, optical elements, etc.

The invention claimed is:

1. A polyamide composition, comprising from 30 wt % to 70 wt % of polyamide mixture and from 30 wt % to 70 wt % of filler mixture, based on the total weight of the polyamide composition;

wherein the polyamide mixture includes as component (A) semi-crystalline semi-aromatic polyamide and as component (B) amorphous polyamide, the mass ratio of (A)/(B) is higher than 1:1; the filler mixture includes as component (C) needle-like fillers having an average length of equal to or less than 150 μm; and as component (D) plate-like fillers, the mass ratio of (C)/(D) is higher than 1:1;

wherein the semi-crystalline semi-aromatic polyamide comprises repeat units derived from dicarboxylic acid and diamine, and 0 to 20 mol % of amino acids and/or lactams, based on the total monomers constituting the semi-crystalline semi-aromatic polyamide;

wherein the dicarboxylic acid is aromatic dicarboxylic acid (a-1), or a combination of the aromatic dicarboxylic acid (a-1) and the other dicarboxylic acid (a-2) including aliphatic dicarboxylic acid and/or cycloaliphatic dicarboxylic acid; the aromatic dicarboxylic acid (a-1) is in an amount of 60-100 mol %, the other dicarboxylic acid (a-2) is in an amount of 0-40 mol %, based on the total mole of the dicarboxylic acids constituting the semi-crystalline semi-aromatic polyamide; the diamine is aliphatic diamine (b-1), or a combination of aliphatic diamine (b-1) and aromatic diamine (b-2); the aliphatic diamine (b-1) is in an amount of 80-100 mol %, the aromatic diamine (b-2) is in an amount of 0-20 mol %, based on the total mole of the diamines constituting the semi-crystalline semi-aromatic polyamide;

or wherein the dicarboxylic acid is aliphatic dicarboxylic acid or a combination of aliphatic dicarboxylic acid and cycloaliphatic dicarboxylic acid; the aliphatic dicarboxylic acid is in an amount of 80-100 mol %, the cycloaliphatic dicarboxylic acid is in an amount of 0-20 mol %, based on the total mole of the dicarboxylic acids constituting the semi-crystalline semi-aromatic polyamide; the diamine is aromatic diamine, a combination of aromatic diamine and aliphatic diamine; the aromatic diamine is in an amount of 80-100 mol %, the aliphatic diamine is in an amount of 0-20 mol %, based on the total mole of the diamines constituting the semi-crystalline semi-aromatic polyamide;

wherein the amorphous polyamide is selected from the group consisting of PA MACM6, PA PACM6, PA PACM10 and PA IPD6, PA 6I, PASI, PA 6I/6T, PA10I/10T, PA 12I/12T, PA PACMI, PA PACMT, PA MACMT, PA MACMI, PA IPDT, PA IPDI, PA DT/DI, PA DT and PA DI, and PA MXD6/MXDI;

wherein the needle-like fillers (C) are selected from the group consisting of glass fibers, chopped glass fibers, milled glass fibers, potassium titanate, and wollastonite;

wherein the plate-like fillers (D) are selected from the group consisting of talc, mica, silicate, quartz, titanium dioxide, wollastonite, kaolin, magnesium carbonate, magnesium hydroxide, chalk, limestone, feldspar, barium sulfate, solid or hollow glass beads, ground glass, glass flakes, and durably magnetic materials selected from the group consisting of magnetizable metal compounds, alloys thereof, and mixtures thereof;

wherein the aspect ratio of length to diameter of the needle-like filler (C) is equal to or higher than 2:1;

wherein the aspect ratio of ECD/T of the plate-like fillers (D) is equal to or greater than 30:1; ECD represents the equivalent circular diameter of the plate-like fillers; T represents the longest thickness of the plate-like fillers.

2. The polyamide composition according to claim 1, wherein the aromatic dicarboxylic acid (a-1) is selected from the group consisting of terephthalic acid, naphthalene dicarboxylic acid, biphenyl dicarboxylic acid, and a combination of at least two thereof; the other dicarboxylic acid (a-2) is selected from the group consisting of adipic acid, suberic acid, azelaic acid, sebacic acid, undecanedioic acid, dodecanedioic acid, tridecanedioic acid, tetradecanedioic acid, pentadecanoic acid, hexadecanedioic acid, and octadecanedioic acid; the aliphatic diamine (b-1) is a linear aliphatic diamine (b-1a) or the combination of a linear aliphatic diamine and a branched aliphatic diamine (b-1b); the linear aliphatic diamine (b-1a) is selected from the group consisting of 1,4-butane diamine, 1,5-pentane diamine, 1,6-hexane diamine, 1,8-octanediamine, 1,9-nonanediamine, 1,10-decanediamine, 1,11-undecanediamine and 1,12-dodecanediamine; the branched aliphatic diamine (b-1b) is selected from the group consisting of 2-methyl-1,5-pentane diamine, 3-methyl-1,5-pentane diamine, 2-methyl-1,8-octanediamine, 2,4,4-trimethylhexamethylene diamine and 2,2,4-trimethylhexamethylene diamine.

3. The polyamide composition according to claim 1, wherein the aromatic dicarboxylic acid (a-1) includes 10-40 mol % of isophthalic acid and 60-90 mol % of at least one dicarboxylic acid selected from the group consisting of terephthalic acid, naphthalene dicarboxylic acid and biphenyl dicarboxylic acid; the other dicarboxylic acid (a-2) is in an amount of 0-10 mol %, based on the total mole of the dicarboxylic acids constituting the semi-crystalline semi-aromatic polyamide;

the diamine includes 90-100 mol % of aliphatic diamine (b-1), or a combination of aliphatic diamine and 0-10 mol % of aromatic diamine (b-2), based on the total mole of the diamines constituting the semi-crystalline semi-aromatic polyamide.

4. The polyamide composition according to claim 1, wherein the amorphous polyamide is PA 6I/6T or PA 12I/12T.

5. The polyamide composition according to claim 1, wherein the semi-crystalline semi-aromatic polyamide (A) is in an amount of from 30 wt % to 65 wt %, the amorphous polyamide (B) is in an amount of from 5 wt % to 30 wt %, based on the total weight of polyamide composition.

6. The polyamide composition according to claim 1, wherein the weight ratio of component (A)/component (B) is equal to or higher than 2:1.

7. The polyamide composition according to claim 1, wherein the needle-like filler (C) has an average length of from 10 μm to 150 μm.

8. The polyamide composition according to claim 1, wherein the plate-like fillers (D) have an average size of from 0.001 μm to 100 μm in their longest thickness or dimensions.

9. The polyamide composition according to claim 1, wherein the plate-like fillers have an average equivalent circular diameter of at least about 10 μm.

10. The polyamide composition according to claim 1, wherein the weight ratio of component (C)/component (D) is equal to or higher than 1.5:1.

11. The polyamide composition according to claim 1, wherein the semi-crystalline semi-aromatic polyamide (A) is in an amount of from 40 wt % to 60 wt %; the amorphous polyamide (B) in the present invention is in an amount of from 10 wt % to 30 wt %; based on the total weight of polyamide composition.

12. The polyamide composition according to claim 1, wherein the weight ratio of component (A)/component (B) is in a range of 3:1 to 2:1.

13. The polyamide composition according to claim 1, wherein the aspect ratio of length to diameter of the needle-like filler (C) is a range from 2:1 to 5000:1.

14. The polyamide composition according to claim 1, wherein the weight ratio of component (A)/component (B) is in a range of 3:1 to 2.5:1.

15. The polyamide composition according to claim 1, wherein the aspect ratio of ECD/T of the plate-like fillers (D) is equal to or greater than 100:1.

16. The polyamide composition according to claim 1, wherein the aspect ratio of ECD/T of the plate-like fillers (D) is equal to or greater than 200:1.

17. The polyamide composition according to claim 1, wherein the aspect ratio of ECD/T of the plate-like fillers (D) is from 100:1 to 500:1.

* * * * *